United States Patent
Evans et al.

(10) Patent No.: US 7,380,069 B2
(45) Date of Patent: May 27, 2008

(54) METHOD AND APPARATUS FOR DMA-GENERATED MEMORY WRITE-BACK

(75) Inventors: Charles Edward Evans, Corvalis, OR (US); Douglas Gene Keithley, Boise, ID (US)

(73) Assignee: Marvell International Technology Ltd., Hamilton (BM)

( * ) Notice: Subject to any disclaimer, the term of this patent is extended or adjusted under 35 U.S.C. 154(b) by 258 days.

(21) Appl. No.: 10/994,011

(22) Filed: Nov. 19, 2004

(65) Prior Publication Data

US 2006/0112236 A1    May 25, 2006

(51) Int. Cl.
*G06F 12/00*  (2006.01)
(52) U.S. Cl. .......... 711/143; 711/161; 711/166
(58) Field of Classification Search ........ None
See application file for complete search history.

(56) References Cited

U.S. PATENT DOCUMENTS

| | | |
|---|---|---|
| 5,031,097 A | 7/1991 | Kitakami et al. |
| 5,261,072 A | 11/1993 | Siegel |
| 5,623,622 A | 4/1997 | Yuki et al. |
| 5,809,333 A | 9/1998 | Story et al. |
| 6,073,223 A | 6/2000 | McAllister et al. |
| 6,115,767 A | 9/2000 | Hashimoto et al. |
| 6,279,063 B1 | 8/2001 | Kawasaki et al. |
| 6,611,852 B1 | 8/2003 | Morley et al. |
| 6,795,078 B2 | 9/2004 | Lavelle et al. |
| 7,124,269 B2 * | 10/2006 | Chuang et al. ............. 711/166 |

* cited by examiner

*Primary Examiner*—Reginald Bragdon
*Assistant Examiner*—Mehdi Namazi

(57) ABSTRACT

A method for memory write-back provides a memory access controller and then generates a write-back pattern in the memory access controller. The write-back pattern is then written back into a memory starting at a predetermined address location and continuing for a predetermined length of the addressing space of the memory.

20 Claims, 3 Drawing Sheets

METHOD AND APPARATUS FOR DMA-GENERATED MEMORY WRITE-BACK

CROSS-REFERENCE TO RELATED APPLICATION

The present application contains subject matter related to U.S. patent application Ser. No. 10/995,987, filed Nov. 19, 2004, by Charles Edward Evans and Douglas Gene Keithley entitled "Method and Apparatus for Intervaled DMA Transfer Access".

BACKGROUND

The present invention relates generally to computer memory management, and more particularly to a method and apparatus for DMA-generated memory write-back.

With each new generation of computer hardware and each new generation of computer software, more and more data needs to be processed in less and less time. This is particularly true of image data and graphics systems, in which the continuing increases in data size and data rates place additional burdens on graphics memory management systems. Attempts to improve graphics system performance to meet these needs are running up against the limitations of memory systems in general, and of memory device limitations in particular.

In graphics applications, it is often desirable or necessary to read data (or a stream of data) from a source, to transfer the data to a destination, and to clear blocks of the source memory after the read operation has completed. The source memory blocks are often cleared (e.g., written with a background data pattern) in anticipation of future operations. This two-step sequential process of reading followed by source clearing/writing is inefficient.

Similar memory operation limitations restrict and retard improvements in the performance of contemporary printers. Printers have become very popular in recent times due to their greatly improved ability to print clear images. Generally, printers are available as monochrome only printers, such as printers that print only in gray and black, or color printers that print in color as well as monochrome. These printers operate by converting an image on a host device such as a personal computer into data that is received in the printer by a printer circuitry board that stores the data in the printer. The printer circuitry board generates coded data representing the image, which is then transmitted by the printer circuitry board to a print engine that drives the mechanisms of the printer to convert the data back into an image that is printed on a print medium, such as paper. Similar procedures can be followed for generating images for other purposes, such as displaying on devices like computer monitors or cell phones.

In many printer products and applications, some of the image information is modified or "corrected" by a computer microprocessor. This processing of the image information can improve the overall quality of the printed image from the printer. For example, the processing can be used to calibrate the image information to adjust for particular printer characteristics, so that the final printed image faithfully reproduces the original image. The processing can also be used to enhance the printed image to improve it over the original image, for example, by the removal of "red eye" in a photograph.

To accomplish these printing objectives, a great deal of information must be stored in the printer memory. In addition to image information, the stored information also includes printer instructions for controlling and directing the processing of the printer image data, and program routines for controlling and directing the printing operation of the printer.

Many modern electronic devices have multiple processors. This is certainly true of printers, which may, for example, have a central processing unit ("CPU") that has overall responsibility for controlling all of the printer operations, and additional processors with specialized duties and functions, such as video controllers, image processors, print engine drivers, and so forth.

In advanced printers, for any given printing operation or print job, the CPU will typically store a set of instructions in the memory to control the processing that is to be done by the other processors. As long as those instructions are stored in memory, the processors that are reading those instructions continue to read the instructions, until the instructions are cleared out of the memory. Sometimes this is desired, such as when the same process needs to be repeated several times. At other times the instructions need to be executed only once. Either way, those instructions need to be cleared from the memory after the instructions have been used, so that the instructions do not continue to be read and repeated over and over.

In other implementations, the CPU will typically initialize a new buffer before operating on the buffer. When implementing a printer language such as Postscript or PCL6, the CPU will add images to a buffer. For example, the letter 'A' needs to be placed at a specified location. The routine that places the 'A' does not know what data is in and around this location, so it uses read-modify writes to update the data in the buffer and not disturb the surrounding image information. This requires that each buffer be initialized to a known value prior to processing the printer language commands.

To clear this memory, it has been necessary for the CPU to clear each memory location individually. For example, the CPU would generate or copy a set of new memory values. The CPU would then either write that set directly into the memory or transfer the set to a memory management device, such as a direct memory access controller ("DMA"), to transfer the set into the memory in order to clear the memory of the now-obsolete instructions.

However, having the CPU go out and clear each memory location independently ties up a lot of the computational capacity of the printing system. That is, this type of memory clearing process compromises much of the bandwidth, speed, and ability of the main CPU, thereby delaying or preventing it from performing other, more important tasks that it needs to perform. Thus, the whole printing system is slowed and does not perform as needed.

One solution is to use a more expensive, more powerful CPU. However, the historical trend in the industry has been the opposite, namely, to reduce costs and simplify systems while finding alternate ways to increase performance.

Thus, a need still remains for faster, more efficient, more effective, and less expensive methods and mechanisms for optimizing memory management. There is a particular need for improvements for use in devices that look to specific areas of memory for instructions, such as in systems used for image processing.

In view of the continuing increases in performance, capabilities, and customer expectations, accompanied by ever-increasing competition and declining prices, it is ever more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a method for memory write-back. A memory access controller is provided. A write-back pattern is generated in the memory access controller. The write-back pattern is then written back into a memory starting at a predetermined address location and continuing for a predetermined length of the addressing space of the memory.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 1:
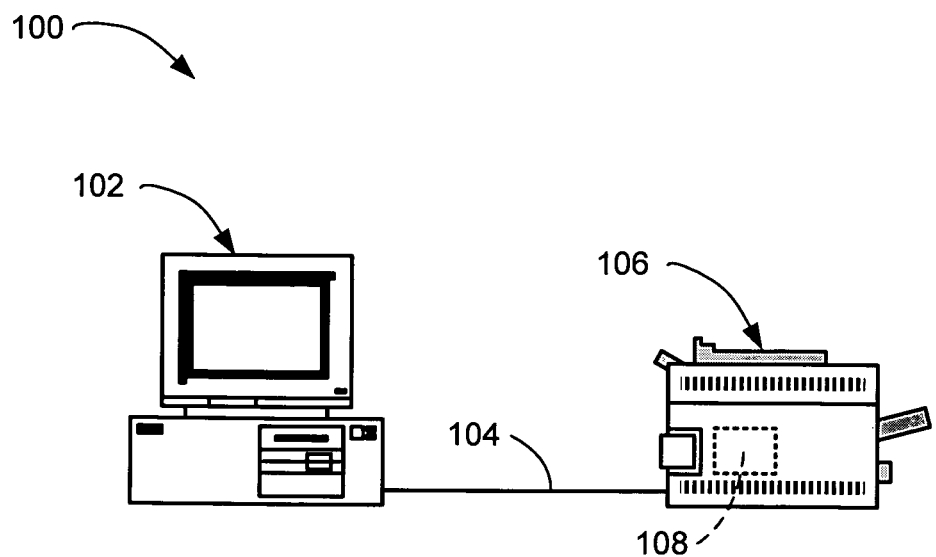
FIG. 1 is a block diagram of a printing system in accordance with an embodiment of the present invention.

In the following description, numerous specific details are given to provide a thorough understanding of the invention. However, it will be apparent to one skilled in the art that the invention may be practiced without these specific details. In order to avoid obscuring the present invention, some well-known circuits, system configurations, and processing steps are not disclosed in detail. Likewise, the drawings showing embodiments of the invention are semi-diagrammatic and not to scale and, particularly, some of the dimensions are for the clarity of presentation and are shown exaggerated in the FIGs. In addition, where multiple embodiments are disclosed and described having some features in common, for clarity and ease of illustration, description, and comprehension thereof, similar and like features one to another will ordinarily be described with like reference numerals.

As used herein, the term "printer" will be understood to encompass all image printing devices that receive a data stream representing an image and, from that data stream, print the represented image on a print medium, for example, a sheet of a paper. The term "print medium", as used herein, will be understood to encompass paper, paper-based products and sheets or planar sections of all other material on which an image may be printed. The term "print medium" will also be understood to encompass an intermediate transfer belt or similar device on which an image is built up before being transferred to another print medium.

Referring now to FIG. 1 therein is shown a block diagram of a printing system 100 in accordance with an embodiment of the present invention. The printing system 100 includes a printer host device 102, such as a personal computer (illustrated), a mainframe computer, a server, a scanner, a modem, a fax machine, an all-in-one scanner-copier-fax-printer, a video camera, a security camera, a videocassette recorder, a digital videodisc, a laser disc player, a personal digital assistant, a wireless telephone, a mobile telephone, or any other device capable of generating or transmitting image data for printing.

The printing system 100 also includes a connection 104 that connects the printer host device 102 to a printer 106, which can be a monochrome or a color printer, for example. The connection 104 is a communication link between the printer host device 102 and the printer 106 over which the printer host device 102 can transmit image data, in the form of print jobs, to the printer 106. The connection 104 may be a direct serial or parallel connection between the printer host device 102 and the printer 106. Alternatively, the connection 104 may be over a local area network ("LAN") or a wide area network ("WAN"). The connection 104 may also be a wireless connection or any other connection over which data can be transferred from the printer host device 102 to the printer 106.

The printer host device 102 customarily runs an application that generates image data representing an image that is to be printed. The image data is transmitted to a host printer driver (not shown) that also customarily runs on the printer host device 102. The host printer driver configures the image data into a form appropriate for transmission to the printer 106 through the connection 104.

The image data is received in the printer 106 by a printer circuitry board 108 located therein. The printer circuitry board 108 provides data storage and processing circuitry for the printer 106. The processing circuitry in the printer circuitry board 108 controls the operation of the printer 106 and performs additional processing on the image data. The additional image data processing includes, for example, formatting of the image for printing, such as providing pixel-by-pixel processing of the image elements to enhance or optimize the image according to the desired effect. Such enhancement, for example, may include artifact removal (e.g., "red-eye"), single dot enhancement, line enhancement, contrast enhancement, color enhancement, resolution enhancement, color trapping, and so forth, as is known and performed in the art.

Figure 2:
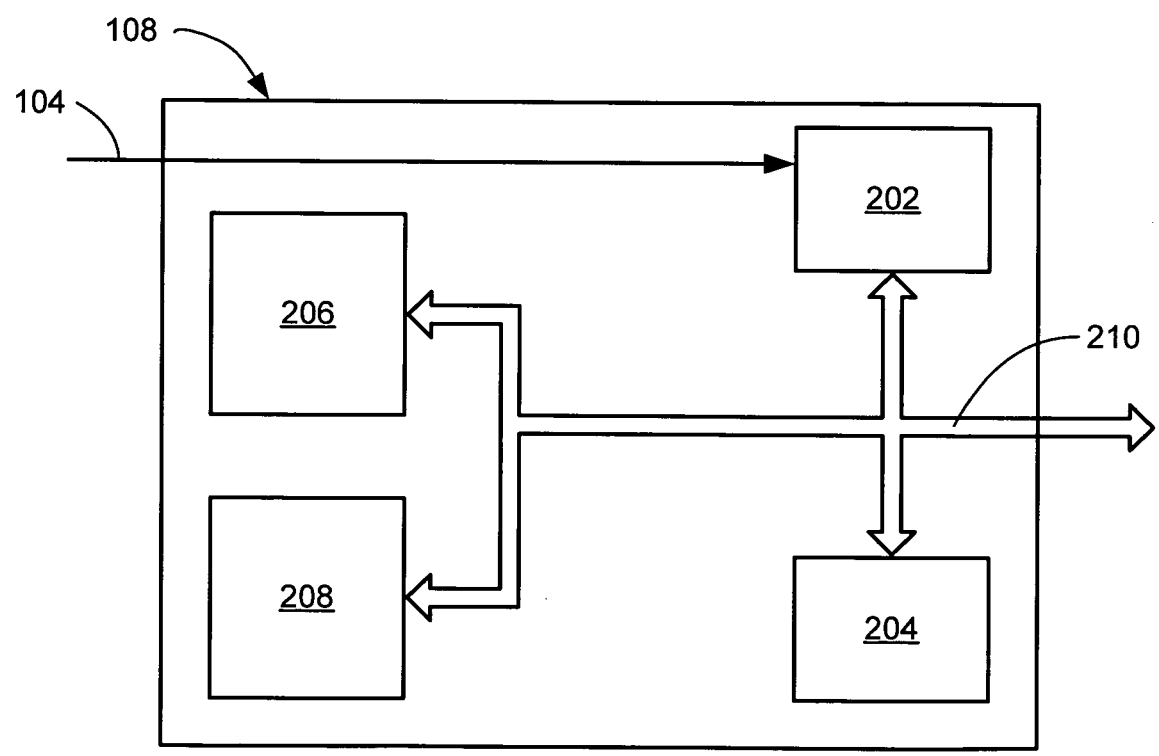
FIG. 2 is a block diagram of the printer circuitry board shown in FIG. 1.

Referring now to FIG. 2, therein is shown a block diagram of the printer circuitry board 108 of FIG. 1. The printer circuitry board 108 includes a central processing unit ("CPU") 202, which is the main processing unit for the printer 106. The printer circuitry board 108 also includes memory 204, a direct memory access controller ("DMA") 206, and a video processor 208. These are connected to and communicate with one another by and through conventional communication lines, such as a data bus 210. Other components, such as a power supply, etc., are also conventionally supplied on the printer circuitry board 108 but are omitted from the drawing FIG. for clarity of illustration and description.

In the operation of one embodiment of the printer circuitry board 108, for example, a page of the data that is to be printed will be transmitted by the printer host device 102 through the connection 104 to the printer circuitry board 108 in the printer 106. The CPU 202 receives the data and stores it in the memory 204 of the printer circuitry board 108. In another embodiment, the page of the data that is to be printed is transmitted from the printer host device 102 in multiple compressed "strips". Before being printed, the strips are decompressed by the CPU 202, or by a dedicated decompressor (not shown) or in-line decompression blocks (not shown), and the data is stored into the memory 204.

Before the image data is printed, it is often processed for any of various purposes, such as those described above. The image data processing can be done by the CPU 202, but for performance, cost, and efficiency reasons, the image data processing is often done by a dedicated video processor such as the video processor 208. By off-loading the image data processing tasks to the video processor 208, the CPU is then free to perform other tasks such as receiving and converting additional image data information from the connection 104, handling networking overhead, supervising input/output ("I/O") protocols (e.g., USB), transmitting status information to the printer host device 102 and possibly additional host devices, and so forth.

The video processor 208 then reads the stored image data from the memory 204, processes it pixel by pixel, and then stores the processed data back into the memory 204. At the appropriate time, the CPU 202 or a separate video controller (not shown) then takes the processed data from the memory 204 and sends it out for printing to a printer engine (not shown) in the printer 106.

For the video processor 208 to perform its processing task, it needs instructions. Those instructions are provided by the CPU 202, which first places a suitable series of task instructions for the task at hand into the memory 204. Such tasks are often highly repetitive, so the video processor 208 may read those instructions many, many times, until the task is completed. The same will generally be true of other tasks that the CPU assigns to other printer processors, such as a video controller or a printer engine, for example.

At the conclusion of the particular printing job, the memory 204 is then typically filled with the various series of instructions related to that printing job. But once the print job has finished, it is usually necessary to clear that memory so the concerned processors do not continue executing the instructions that are stored there. In the past, clearing the memory has been a task that the CPU 202 has had to do itself, taking power away from the other tasks that the CPU 202 could be doing. Clearing the memory 204 by means of the CPU 202 also tied up the data bus 210 between the memory 204 and the CPU 202.

Additionally, to perform certain other processing tasks, the CPU 202 needs to initialize buffers stored in the memory 204 prior to using the buffers. Since each page can be comprised of many buffers, this task also takes power away from other tasks that the CPU 202 could be doing.

It has been discovered that the DMA 206, which is not a CPU, can nevertheless be used to clear the memory directly without requiring direct, continuing intervention by a CPU, such as the CPU 202. In the past, DMA's have transferred data by first receiving data and then forwarding it. When the data that is to be transferred does not exist, it must first be generated under the continuing direction and/or control of the CPU. Thus, in prior embodiments, a DMA would be able to clear the memory by transferring a repetitive pattern, such as 0's or 1's, only after that particular pattern was generated and/or copied into the memory, typically by the CPU. It was therefore the CPU itself that generated or provided the clearing pattern, reducing the ability of the CPU to perform other tasks.

As discovered and taught by the present invention, however, it is possible to specially configure the DMA 206 to perform the memory clearing task without tying up the CPU 202. To accomplish this, the DMA 206 itself generates the clearing pattern and backfills or writes-back the pattern into the memory starting at a specified location and continuing for a specified length of the addressing space of the memory. As used herein, the term "generate" means that more write-back data is provided ("generated") by the DMA 206 than is provided to it. This contrasts with a conventional DMA memory or data transfer operation, in which the conventional DMA reads in and writes out equal amounts of data, whereas according to the present invention the DMA 206 can itself generate (or originate) most if not all of the data that is written out to the memory 204.

The instructions for the desired write-back pattern, starting location, and the length of the addressing space of the memory to be written to are initially provided to the DMA 206 by the CPU 202, such as through the data bus 210. The DMA 206 then takes over and rapidly clears the memory without further supervision by the CPU 202, and without additional delays and overhead from first having to read-in all the write-back pattern clearing data (and possibly having to wait for that data to first be generated elsewhere, as by a CPU, and then placed into memory in order to be read by the DMA).

Figure 3:
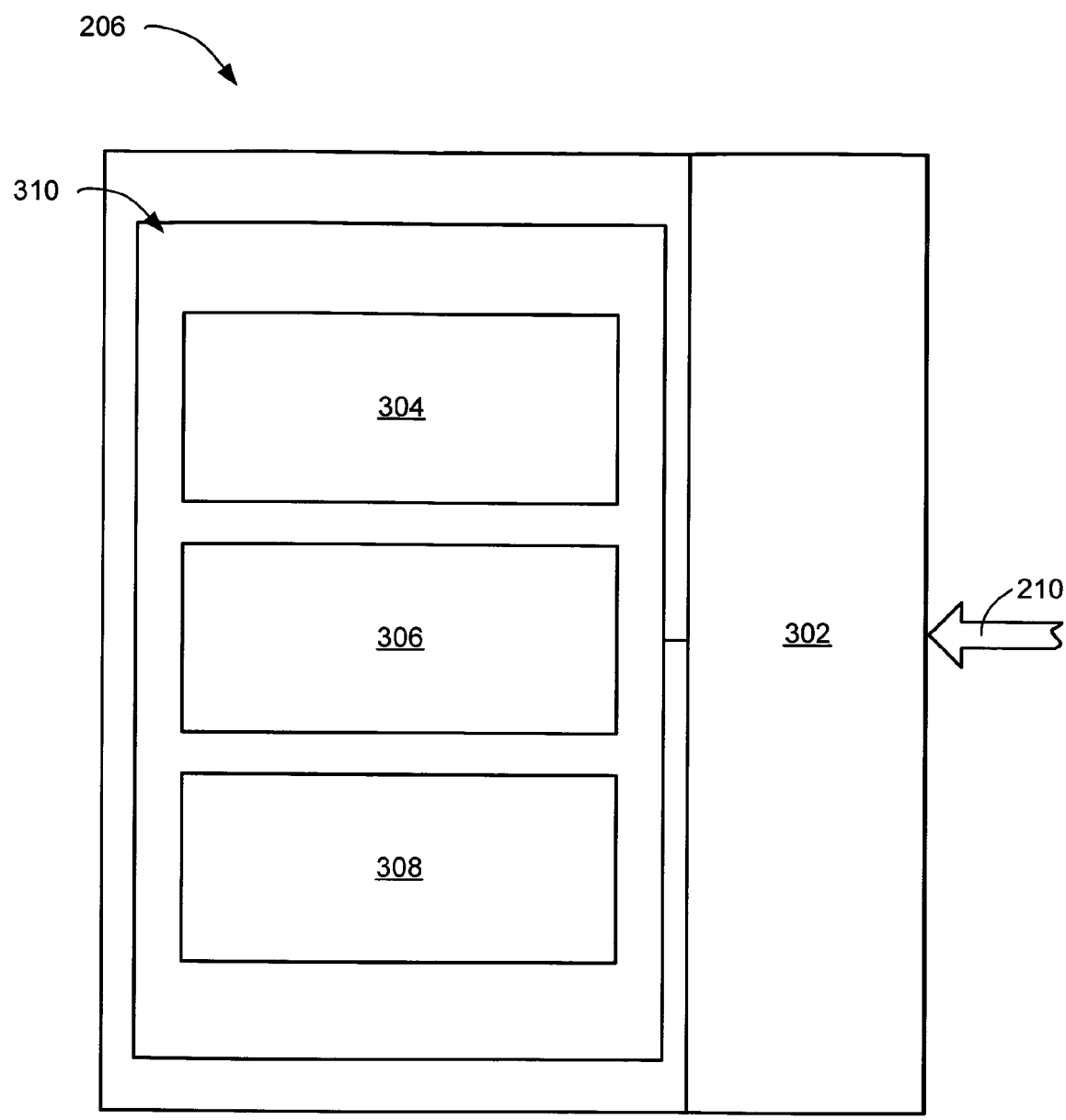
FIG. 3 is a block diagram of the direct memory access controller shown in FIG. 2.

Referring now to FIG. 3, therein is shown a block diagram of the DMA 206 shown in FIG. 2. The DMA 206 includes an interface 302 connecting to the data bus 210, and through the data bus 210 to the remainder of the printer circuitry board 108 (FIG. 2). Using the interface 302, the DMA 206 has the customary ability to either pull data from the memory 204 (FIG. 2) or put data into the memory 204, using a conventional DMA internal storage area (not shown) for holding data during such a typical pull-put memory-move operation. In known fashion, this enables the CPU 202 (FIG. 2) to command the DMA 206 to move data from one location to another in the memory 204 without requiring continuing use of the immediate resources of the CPU 202 itself. Instead, the CPU 202 needs only, for example, to specify the address location in the memory 204 to begin reading from, the length of the address space to be read, and the beginning address location where the data is then to be written to. The DMA 206 then completes the memory-move task on its own, releasing the CPU 202 resources for other tasks. Operation of the DMA 206 in this known manner can be referred to as "normal mode".

According to an embodiment of the present invention, the DMA 206 of the present invention accomplishes the memory clearing task much more efficiently by operating in another, unique mode that omits (e.g., by bypassing) the conventional DMA operation that first fetches data from the memory 204. Instead, as taught herein, the CPU 202 specifies a desired memory fill value 304 (e.g., all 0's, or another desired pattern) for the memory write-back clearing operation, an address location 306 in the memory 204 to begin writing back to, and a length 308 of the address space into which the memory fill value is to be written. These parameters can all be stored in various registers 310 in the DMA 206. The DMA 206 then repeatedly generates those memory fill values and writes them back consecutively to the corresponding memory address locations, as specified by the corresponding parameters in the registers 310. Operation of the DMA 206 in this manner can be referred to as "memory clearing mode" or "memory patterning mode", depending upon the nature and pattern of the write-back data.

Thus, in one embodiment, the CPU 202 instructs the DMA 206 to operate in the normal mode when a conventional memory transfer task is to be effected, and to operate in the memory clearing mode when a memory clearing task is to be effected. When in the normal mode, the DMA 206 then obtains the memory data values externally, such as from the memory 204, according to the instructions that are provided to it. When in the memory clearing mode, the DMA 206 generates the memory data values internally and then writes them back to the memory 204 according to the instructions that are provided to the DMA 206. The overhead load on the CPU 202 is thus minimized in both cases, and a much more efficient and cost-effective performance improvement is afforded without requiring exotic or higher-cost computational components.

Based on the disclosure of the embodiments of the present invention, it will now be clear to one of ordinary skill in the art that various modifications can readily be made to enhance the versatility and power of the present invention. For instance, the present invention can be utilized for memory filling in addition to memory clearing. For example, the CPU 202 can specify a repeating write-back data pattern as the memory fill value 304 of the DMA 206, and the repeating data pattern can then be filled into a specified memory space by the DMA 206 without further supervision by the CPU 202. The pattern that is to be repeated can be a standard pattern that is programmed into the DMA 206, or it can be a certain pattern that is loaded by the CPU 202 into a register of the DMA 206, for the particular memory write-back filling operation that is utilized for this memory patterning mode operation.

Figure 4:
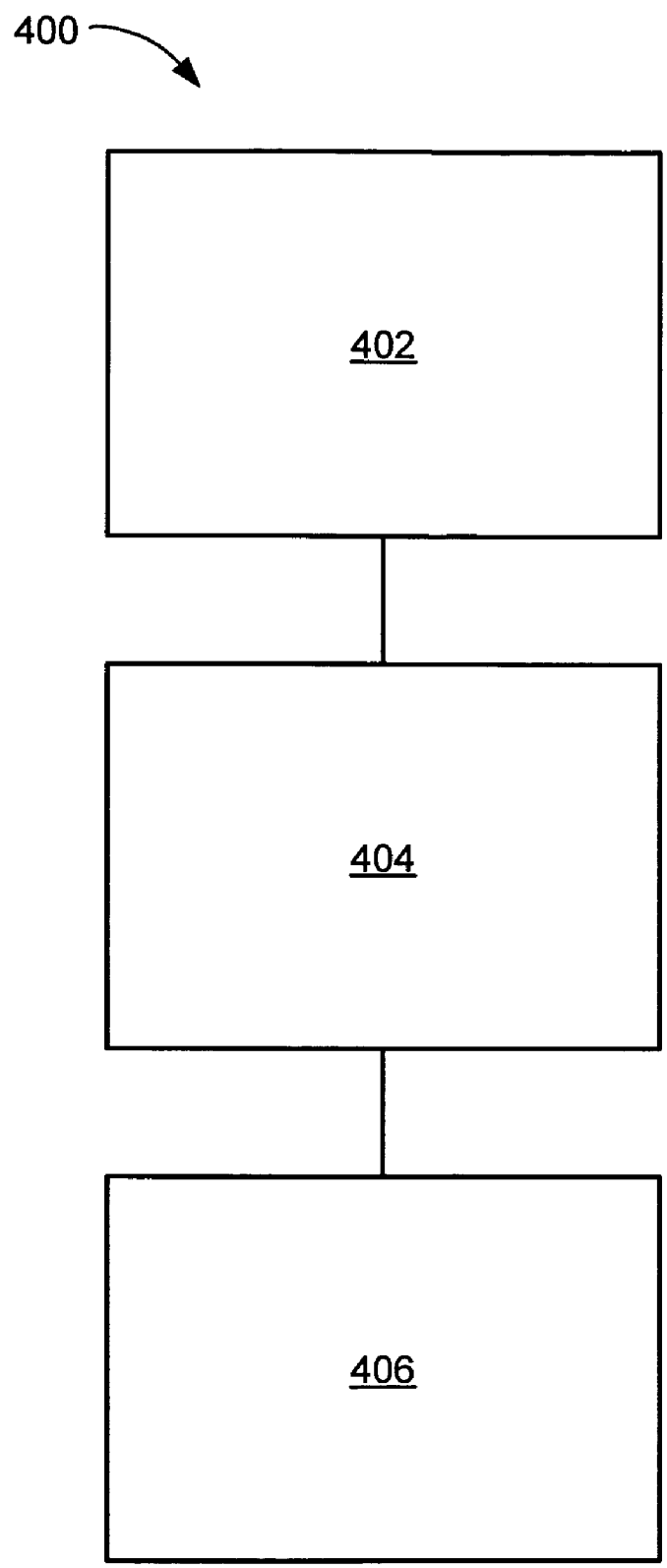
FIG. 4 is a flow chart of a method for memory write-back in accordance with the present invention.

Referring now to FIG. 4, therein is shown a flow chart of a method 400 for memory write-back in accordance with the present invention. The method 400 includes providing a memory access controller in a block 402; generating a write-back pattern in the memory access controller in a block 404; and writing-back the write-back pattern into a memory starting at a predetermined address location and continuing for a predetermined length of the addressing space of the memory, in a block 406.

It has been discovered that the present invention thus has numerous aspects.

A major aspect of the present invention is that it provides faster, more efficient, more effective, and less expensive methods and mechanisms for optimizing memory management, particularly for, but not limited to, image processing.

A particular aspect is that the CPU does not need to go out and clear each memory location independently, and therefore the computational capacity of the CPU is not compromised.

An additional aspect is that bus bandwidth is increased since the DMA only accesses the bus once per transfer, instead of the typical twice per transfer.

Accordingly, another aspect of the present invention is that the main CPU is not delayed or prevented from performing other, more important tasks that it needs to perform, for example for a printer, so that the overall printing system is not slowed, since the bandwidth, speed, and ability of the main CPU are not compromised.

Thus, an additional aspect is that substantial CPU resources remain available for servicing the remainder of a printing system, not only thereby avoiding slowdowns, but in fact enabling improvements in printer performance without the increased costs of higher performance components.

Another aspect of the present invention is that it may also be used with devices, such as an all-in-one device, that can print without the use of a separate host device. Thus the present invention can also be used with devices, for example, that can print directly from a memory card, or can otherwise run locally and receive image data from another feature that is located within the printing device itself.

Another aspect of the present invention is that it is not limited just to use in printers, but can also be beneficially applied to image processing for the full range of image generation and display technologies.

Accordingly, yet another aspect of the present invention is that, in addition to use in printers, the present invention can be used as well for image processing in display devices such as computer displays, cell phones, video cameras, personal digital assistants, and so forth.

Still another aspect is that the memory write-back method and apparatus of the present invention can be utilized in fact in any memory management environment or protocol, not necessarily limited to image processing.

Thus, an additional aspect is that the present invention can be used wherever a certain write-back data pattern needs to be written to or filled into a memory space, without tying up, and without requiring detailed supervision by, a main CPU.

Yet another important aspect of the present invention is that it can in fact be used in processing environments not limited to those utilizing a CPU, but rather can be used with any appropriate configuration employing a suitable bus master.

Yet another important aspect of the present invention is that it valuably supports and services the historical trend of reducing costs, simplifying systems, and increasing performance.

Thus, it has been discovered that the image processing accelerating method and apparatus of the present invention furnish important and heretofore unknown and unavailable solutions and capabilities for increasing image processing speeds and significantly reducing delays caused by main memory access and memory management. Savings and benefits are also realized through reduced hardware and computational resource needs. Further, the resulting processes and configurations are straightforward, economical, uncomplicated, highly versatile and effective, can be implemented by adapting known technologies, and are thus readily suited for incorporation into the widest variety of printing and display devices.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters hithertofore set forth herein or shown in the accompanying drawings are to be interpreted in an illustrative and non-limiting sense.

The invention claimed is:

1. A method for memory write-back, comprising:
providing a memory access controller;
generating a write-back pattern in the memory access controller, wherein the memory access controller generates all of the write-back pattern; and
writing-back the write-back pattern into a memory starting at a predetermined address location and continuing for a predetermined length of the addressing space of the memory.

2. The method of claim 1 wherein the write-back pattern is a clearing pattern.

3. The method of claim 1 wherein the write-back pattern is a repeating write-back data pattern.

4. The method of claim 3 wherein the repeating write-back data pattern comprises a pattern of bit values other than a single bit value.

5. The method of claim 1 wherein the write-back pattern is a repeating write-back data pattern that is a standard pattern that is programmed into the memory access controller.

6. The method of claim 1 further comprising performing the memory write-back in a printer memory.

7. The method of claim 1 further comprising performing the memory write-back in a memory clearing mode or a memory filling mode.

8. A method for memory write-back, comprising:
providing a direct memory access controller;
providing a central processing unit that specifies:
- an address location in a memory to begin writing to; and
- a length of the addressing space of the memory into which a memory write-back value is to be written;

generating a write-back pattern in the direct memory access controller, wherein the direct memory access controller generates all of the write-back pattern; and writing-back the write-back pattern into the memory starting at the address location and continuing for the length of the addressing space of the memory.

9. The method of claim 8 wherein the write-back pattern is a clearing pattern.

10. The method of claim 8 wherein the write-back pattern is a repeating write-back data pattern.

11. The method of claim 8 wherein the write-back pattern is a repeating write-back data pattern that is a standard pattern that is programmed into the direct memory access controller.

12. The method of claim 8 further comprising performing the memory write-back in a memory clearing mode or a memory filling mode.

13. The method of 8 further comprising performing the memory write-back without receiving a write-back value from a bus master.

14. Apparatus for memory write-back, comprising:
a memory access controller;
circuitry in the memory access controller for generating a write-back pattern, wherein the circuitry in the memory access controller is configured to generate all of the write-back pattern; and
circuitry for writing-back the write-back pattern into a memory starting at a predetermined address location and continuing for a predetermined length of the addressing space of the memory.

15. The apparatus of claim 14 wherein the write-back pattern is a clearing pattern.

16. The apparatus of claim 14 wherein the write-back pattern is a repeating write-back data pattern.

17. The apparatus of claim 14 wherein the write-back pattern is a repeating write-back data pattern that is a standard pattern that is programmed into the memory access controller.

18. The apparatus of claim 14 wherein the memory write-back is performed in a printer memory.

19. The apparatus of claim 14 further comprising circuitry for performing the memory write-back in a memory clearing mode or a memory filling mode.

20. The apparatus of claim 14 wherein the memory comprises a memory of a portable computing device.

* * * * *